United States Patent
Wagenknight

(10) Patent No.: US 10,563,309 B1
(45) Date of Patent: Feb. 18, 2020

(54) METHOD FOR CREATING A TEXTURED PRESS PLATE

(71) Applicant: Kings Mountain International, Inc., Kings Mountain, NC (US)

(72) Inventor: Stephen Wagenknight, Gastonia, NC (US)

(73) Assignee: Kings Mountain International, Inc., Kings Mountain, NC (US)

( * ) Notice: Subject to any disclaimer, the term of this patent is extended or adjusted under 35 U.S.C. 154(b) by 456 days.

(21) Appl. No.: 15/293,175

(22) Filed: Oct. 13, 2016

Related U.S. Application Data

(60) Provisional application No. 62/240,869, filed on Oct. 13, 2015.

(51) Int. Cl.
| | |
|---|---|
| C23C 18/31 | (2006.01) |
| C23C 18/16 | (2006.01) |
| B29C 59/02 | (2006.01) |
| B29L 31/00 | (2006.01) |

(52) U.S. Cl.
CPC .......... C23C 18/31 (2013.01); B29C 59/022 (2013.01); C23C 18/1633 (2013.01); C23C 18/1689 (2013.01); B29L 2031/757 (2013.01)

(58) Field of Classification Search
CPC . C23C 18/1633; C23C 18/1689; C23C 18/31; B05D 1/32
See application file for complete search history.

(56) References Cited

U.S. PATENT DOCUMENTS

| 759,817 A | 5/1904 | Marriott |
|---|---|---|
| 2,854,336 A | 9/1958 | Gutknecht |
| 4,052,217 A | 10/1977 | Watkinson |
| 4,213,819 A | 7/1980 | Werthmann |
| 4,294,650 A | 10/1981 | Werthmann |
| 4,582,566 A | 4/1986 | Grey |
| 4,873,134 A | 10/1989 | Fulton et al. |
| 5,105,204 A | 4/1992 | Hoisington |
| 5,298,116 A | 3/1994 | Werthmann |
| 5,596,912 A | 1/1997 | Laurence et al. |
| 6,849,308 B1 | 2/2005 | Speakman et al. |

(Continued)

FOREIGN PATENT DOCUMENTS

| DE | 10217919 A1 | 11/2003 |
|---|---|---|
| DE | 10224128 A1 | 12/2003 |

(Continued)

OTHER PUBLICATIONS

EP Search Report for EP12185205, dated Jan. 28, 2013.

*Primary Examiner* — Nathan H Empie
(74) *Attorney, Agent, or Firm* — Moore & Van Allen PLLC; Peter B. Stewart

(57) ABSTRACT

Disclosed is a method for creating a textured press plate. Initially, a mask may be applied to a surface of a press plate. This mask typically corresponds to a desired physical surface structure. Thereafter, the masked surface of the press plate is processed to obtain the desired physical surface structure. Thereafter, various techniques may be used to create differing degrees of gloss in differing portions of the surface of the press plate. For example, matting may be used to decrease the degree of gloss of a portion of the surface, and polishing may be used to increase the degree of gloss of a portion of the surface.

6 Claims, 10 Drawing Sheets

(56) References Cited

U.S. PATENT DOCUMENTS

| | | |
|---|---|---|
| 7,360,885 B2 | 4/2008 | Hirai |
| 7,538,149 B2 | 5/2009 | Aoai |
| 7,959,817 B2 | 6/2011 | Luetgert et al. |
| 8,246,339 B2 | 8/2012 | Luetgert et al. |
| 8,316,604 B2 | 11/2012 | Thiers |
| 8,365,488 B2 | 2/2013 | Chen |
| 8,778,202 B2 | 7/2014 | Bumgardner |
| 8,784,671 B2 | 7/2014 | Vermeulen |
| 2002/0160680 A1 | 10/2002 | Laurence et al. |
| 2003/0045412 A1 | 3/2003 | Schulz et al. |
| 2003/0089610 A1 | 5/2003 | Lettmann |
| 2004/0119772 A1 | 6/2004 | Hoshino |
| 2006/0144004 A1 | 7/2006 | Nollet et al. |
| 2007/0039818 A1 | 2/2007 | Hasegawa |
| 2007/0068898 A1 | 3/2007 | Lorenz |
| 2007/0201131 A1 | 8/2007 | Katsura |
| 2008/0122914 A1 | 5/2008 | Toma et al. |
| 2008/0199672 A1 | 8/2008 | Ruhdorfer |
| 2008/0268273 A1 | 10/2008 | O'Brien et al. |
| 2009/0155593 A1 | 6/2009 | O'Brien et al. |
| 2010/0103235 A1 | 4/2010 | Roof et al. |
| 2010/0177151 A1 | 7/2010 | Thompson et al. |
| 2010/0196678 A1 | 8/2010 | Vermeulen |
| 2010/0243138 A1 | 9/2010 | Laurent et al. |
| 2011/0048254 A1 | 3/2011 | Espe et al. |
| 2011/0102525 A1 | 5/2011 | Larson et al. |
| 2011/0117325 A1 | 5/2011 | Segaert |
| 2011/0262765 A1 | 10/2011 | Yu et al. |
| 2011/0287203 A1 | 11/2011 | Victor et al. |
| 2012/0320117 A1 | 12/2012 | Roof et al. |
| 2013/0025216 A1 | 1/2013 | Reichwein et al. |
| 2013/0033549 A1 | 2/2013 | Barton et al. |
| 2013/0075363 A1 | 3/2013 | Bumgardner |
| 2013/0297146 A1 | 11/2013 | Perugu et al. |
| 2013/0299454 A1* | 11/2013 | Marxen ............... B44B 5/026 216/41 |

FOREIGN PATENT DOCUMENTS

| | | |
|---|---|---|
| DE | 60107116 | 12/2004 |
| DE | 102004041434 A1 | 3/2006 |
| EP | 0179940 A1 | 9/1988 |
| EP | 1034876 A1 | 5/2002 |
| EP | 2045363 A1 | 4/2009 |
| EP | 2060658 A2 | 5/2009 |
| EP | 2123476 A2 | 11/2009 |
| EP | 2179855 A2 | 4/2010 |
| EP | 2206606 A1 | 7/2010 |
| EP | 2251193 A1 | 11/2010 |
| EP | 2412516 A2 | 2/2012 |
| EP | 2497650 A1 | 9/2012 |
| JP | 03010804 A | 1/1991 |
| JP | 200466673 A | 3/2004 |
| KR | 1020010029821 A | 9/2002 |
| KR | 1020140029374 A | 3/2014 |
| WO | 1992019461 A1 | 11/1992 |
| WO | 2005018941 A1 | 3/2005 |
| WO | 2006063803 A2 | 6/2006 |
| WO | 2006066776 A2 | 6/2006 |
| WO | 2007025893 A1 | 3/2007 |
| WO | 2008110883 A2 | 9/2008 |
| WO | 2009043910 A1 | 4/2009 |
| WO | 2011039665 A1 | 4/2011 |
| WO | 2011141849 A2 | 11/2011 |

* cited by examiner

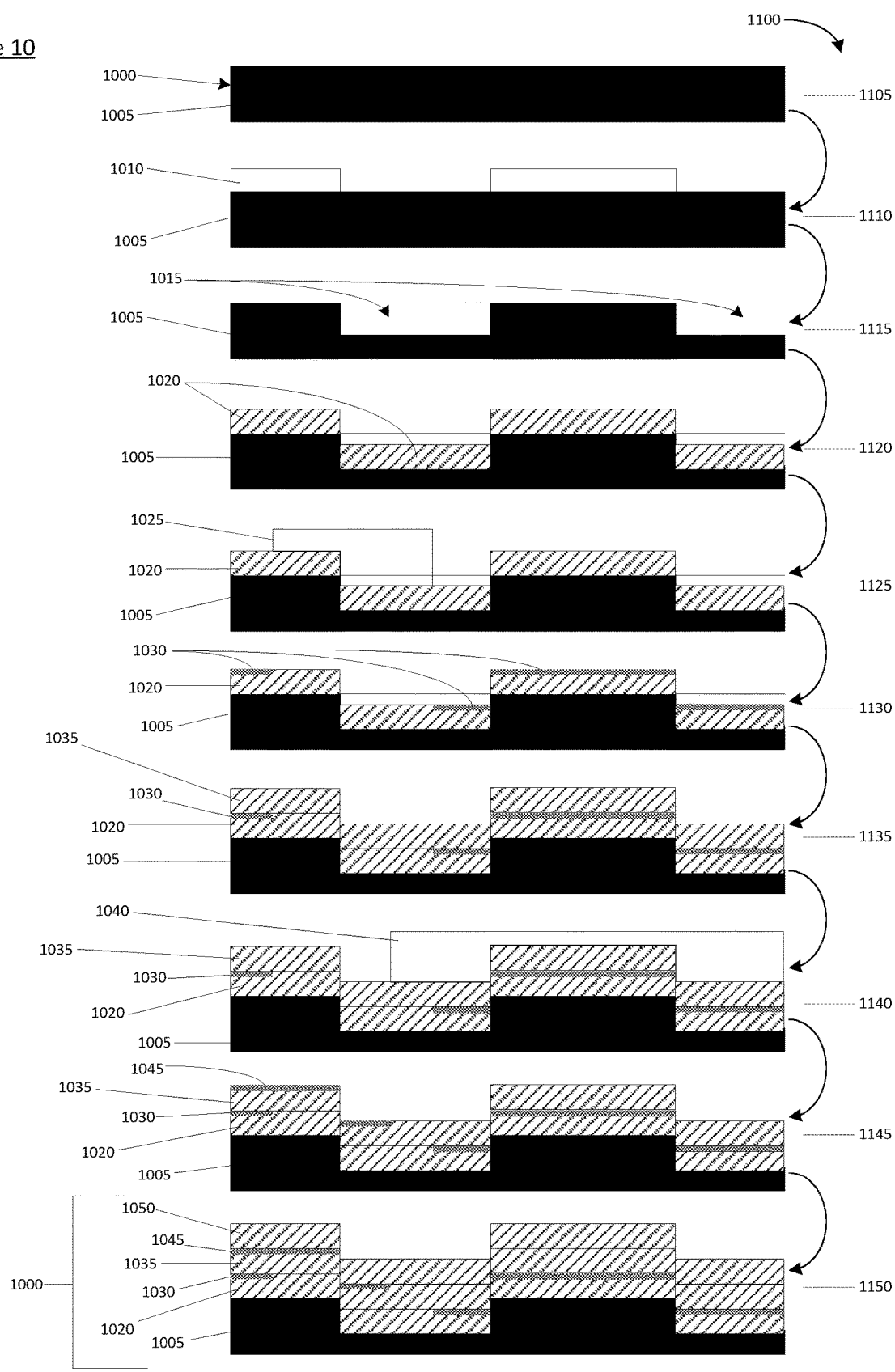

METHOD FOR CREATING A TEXTURED PRESS PLATE

CROSS-REFERENCE TO RELATED APPLICATION

This application claims the benefit of U.S. Provisional Application No. 62/240,869, filed Oct. 13, 2015, which is hereby incorporated by reference in its entirety.

FIELD OF THE INVENTION

The present invention embraces a method for creating a textured press plate. Initially, the surface of the press plate is processed to obtain the desired physical surface structure. Thereafter, various techniques may be used to create differing degrees of gloss in differing portions of the surface of the press plate.

BACKGROUND

Decorative laminates have been used as surfacing material for many years, in both commercial and residential applications. Decorative laminates can provide an aesthetically pleasing surface that is more economical and/or has improved physical characteristics compared to similar looking alternatives. For example, decorative laminates can be used to create flooring that has the appearance of real hardwood flooring but is less expensive and more durable than real hardwood flooring.

In addition to flooring, decorative laminates are often used in furniture, countertops, cabinets, wall paneling, partitions, fixtures, and the like. As described above, decorative laminates can be made to resemble real wood. Decorative laminates can also be made to resemble such other materials and surfaces as stone, ceramic, marble, concrete, leather, fabric, brick, tile, and the like. In other applications, instead of being made to resemble a particular traditional material or surface, a decorative laminate may be made to provide more fanciful surfaces.

More recently, decorative laminates have been improved to include a three-dimensional "textured" surface. In this way, decorative laminates can be made to not only look like some other material or surface, but can also be made to feel like the other material or surface. In fact, decorative laminates can be made to so closely resemble the look and feel of other materials that one cannot easily determine whether the surface includes the real materials or is a faux representation of the real materials. For example, a textured decorative laminate made to look like real wood paneling may include a plurality of depressions and/or protrusions on its surface to create a texture that simulates the grains and knots of real wood boards. In another example, the textured decorative laminate may be made to look like a plurality of ceramic tiles separated by grout lines. In such an embodiment, the surface of the laminate may be made so that the images of the grout lines are depressed relative to the images of the ceramic tiles. In still other applications, textured decorative laminates may be made with more fanciful virtual artwork and may have embossing and textures that work in conjunction with the virtual artwork to create a more interesting and aesthetically pleasing surface.

In order to create a textured laminate, a press plate having depressions and/or protrusions arranged in a three-dimensional design may be pressed into a substrate. When the press plate is physically pressed into the substrate, the substrate is imprinted with the three-dimensional design present in the surface of the press plate.

To create a textured press plate, a rigid substrate may be precisely ground until a press plate substrate is substantially flat. Thereafter, a selected texture design (e.g., mask) may be printed onto the substrate to guide a subsequent etching process. Once the design is properly printed, various surface portions of the substrate may be etched based on the printed design to create a three-dimensional surface thereon. The result of this etching transforms the substrate into a textured (e.g., three-dimensional) press plate that can be used to produce textured decorative laminates.

In some instances, textured laminates that have multiple degrees of gloss may be desirable. In this regard, having multiple degrees of gloss may increase the variety of shadings and color reflects of a textured laminate, thus making the textured laminate appear more realistic. Therefore, a need exists for an improved method of creating a press plate having multiple degrees of gloss.

SUMMARY

In one aspect, the present invention embraces a method for creating a textured press plate.

In one embodiment, a method for creating a textured press plate includes: applying a mask to a working surface of a press plate, processing the working surface of the press plate to obtain a structure in the working surface of the press plate, polishing the working surface of the press plate, cleaning the working surface of the press plate, applying a first metallic coating to the entire working surface of the press plate; applying a first protective layer over portions of the working surface of the press plate; adjusting a level of gloss for a portion of the working surface of the press plate not covered by the first protective layer; removing the first protective layer; applying a second metallic coating to the entire working surface of the press plate; applying a second protective layer over portions of the working surface of the press plate; adjusting a level of gloss for a portion of the working surface of the press plate not covered by the second protective layer; removing the second protective layer; and applying a third metallic coating to the entire working surface of the press plate.

In some embodiments of the method, the first metallic coating, the second metallic coating, or the third metallic coating comprises a chromium plating.

In some embodiments of the method, adjusting the level of gloss for the portion of the working surface of the press plate not covered by the first protective layer further comprises: polishing the working surface of the press plate not covered by the first protective layer; matting the working surface of the press plate not covered by the first protective layer; or applying a new metallic coating to the working surface of the press plate not covered by the first protective layer.

In some embodiments of the method, adjusting the level of gloss for the portion of the working surface of the press plate not covered by the second protective layer further comprises: polishing the working surface of the press plate not covered by the second protective layer; matting the working surface of the press plate not covered by the second protective layer; or applying a new metallic coating to the working surface of the press plate not covered by the second protective layer.

The method may also comprise, in response to adjusting the level of gloss for the portion of the working surface of the press plate not covered by the first protective layer, applying a new protective layer over portions of the working surface of the press plate; and adjusting the level of gloss for the portion of the working surface of the press plate not covered by the new protective layer.

Finally, in some embodiments, the method further comprises, after processing the working surface of the press plate to obtain the structure in the working surface of the press plate, applying a new mask to the working surface of a press plate; and processing the working surface of the press plate to obtain an additional structure in the working surface of the press plate at portions of the working surface of the press plate that are not covered by the new mask.

In another embodiment, a textured press plate product is prepared, manufactured, or otherwise created by a process comprising the steps of: applying a mask to a working surface of a press plate; processing the working surface of the press plate to obtain a structure in the working surface of the press plate; polishing the working surface of the press plate; cleaning the working surface of the press plate; applying a first metallic coating to the entire working surface of the press plate; applying a first protective layer over portions of the working surface of the press plate; adjusting a level of gloss for a portion of the working surface of the press plate not covered by the first protective layer; removing the first protective layer; applying a second metallic coating to the entire working surface of the press plate; applying a second protective layer over portions of the working surface of the press plate; adjusting a level of gloss for a portion of the working surface of the press plate not covered by the second protective layer; removing the second protective layer; and applying a third metallic coating to the entire working surface of the press plate.

In some embodiments of the process for preparing the textured press plate product, the first metallic coating, the second metallic coating, or the third metallic coating comprises a chromium plating.

In some embodiments of the process for preparing the textured press plate product, adjusting the level of gloss for the portion of the working surface of the press plate not covered by the first protective layer further comprises: polishing the working surface of the press plate not covered by the first protective layer; matting the working surface of the press plate not covered by the first protective layer; or applying a new metallic coating to the working surface of the press plate not covered by the first protective layer.

In some embodiments of the process for preparing the textured press plate product, adjusting the level of gloss for the portion of the working surface of the press plate not covered by the second protective layer further comprises: polishing the working surface of the press plate not covered by the second protective layer; matting the working surface of the press plate not covered by the second protective layer; or applying a new metallic coating to the working surface of the press plate not covered by the second protective layer.

Furthermore, in some embodiments, the process by which the textured press plate product is prepared further comprises: in response to adjusting the level of gloss for the portion of the working surface of the press plate not covered by the first protective layer, applying a new protective layer over portions of the working surface of the press plate; and adjusting the level of gloss for the portion of the working surface of the press plate not covered by the new protective layer.

Additionally, in some embodiments, the process by which the textured press plate product is prepared further comprises: in response to adjusting the level of gloss for the portion of the working surface of the press plate not covered by the second protective layer, applying a new protective layer over portions of the working surface of the press plate; and adjusting the level of gloss for the portion of the working surface of the press plate not covered by the new protective layer.

Finally, some embodiments of the process for preparing the textured press plate product comprise: after processing the working surface of the press plate to obtain the structure in the working surface of the press plate, applying a new mask to the working surface of a press plate; and processing the working surface of the press plate to obtain an additional structure in the working surface of the press plate at portions of the working surface of the press plate that are not covered by the new mask.

Another embodiment comprises a textured press plate, wherein a working surface of the textured press plate comprises: a first chromium plating layer formed over the entire base press plate layer, wherein a surface of the first chromium plating layer comprises varied gloss levels; a second chromium plating layer formed over the entire first chromium plating layer, wherein a surface of the second chromium plating layer comprises varied gloss levels; and a third chromium plating layer formed over the entire second chromium plating layer.

In one embodiment, a method for creating a textured press plate includes: applying a mask to a surface of a press plate; processing the surface of the press plate to obtain a surface structure in the surface of the press plate; polishing the surface of the press plate; cleaning the surface of the press plate; matting the surface of the press plate to obtain a first degree of gloss on the surface of the press plate; applying a first protective layer over portions of the surface of the press plate; polishing the surface of the press plate to obtain a second degree of gloss on the surface of the press plate; applying a metallic coating to the surface of the press plate; applying a second protective layer over portions of the surface of the press plate; and matting the surface of the press plate to obtain a third degree of gloss on the surface of the press plate.

In another embodiment, a method for creating a textured press plate includes: applying a mask to a surface of a press plate; processing the surface of the press plate to obtain a surface structure in the surface of the press plate; polishing the surface of the press plate; cleaning the surface of the press plate; matting the surface of the press plate to obtain a first degree of gloss on the surface of the press plate; applying a first protective layer over portions of the surface of the press plate; polishing the surface of the press plate to obtain a second degree of gloss on the surface of the press plate; applying a second protective layer over portions of the surface of the press plate; matting the surface of the press plate to obtain a third degree of gloss on the surface of the press plate; and applying a metallic coating to the surface of the press plate.

In another embodiment, a method for creating a textured press plate includes: applying a mask to a surface of a press plate; processing the surface of the press plate to obtain a surface structure in the surface of the press plate; polishing the surface of the press plate; cleaning the surface of the press plate; matting the surface of the press plate to obtain a first degree of gloss on the surface of the press plate; applying a first protective layer over portions of the surface of the press plate; polishing the surface of the press plate to obtain a second degree of gloss on the surface of the press plate; applying a metallic coating to the surface of the press plate; applying a second protective layer over portions of the surface of the press plate; polishing the surface of the press plate to obtain a third degree of gloss on the surface of the press plate; applying a third protective layer over portions of the surface of the press plate; and matting the surface of the press plate to obtain a fourth degree of gloss on the surface of the press plate.

In another embodiment, a method for creating a textured press plate includes: applying a mask to a surface of a press plate; processing the surface of the press plate to obtain a surface structure in the surface of the press plate; polishing the surface of the press plate; cleaning the surface of the press plate; matting the surface of the press plate to obtain a first degree of gloss on the surface of the press plate; applying a first protective layer over portions of the surface of the press plate; polishing the surface of the press plate to obtain a second degree of gloss on the surface of the press plate; applying a metallic coating to the surface of the press plate; applying a second protective layer over portions of the surface of the press plate; matting the surface of the press plate to obtain a third degree of gloss on the surface of the press plate; applying a third protective layer over portions of the surface of the press plate; and polishing the surface of the press plate to obtain a fourth degree of gloss on the surface of the press plate.

In another embodiment, a method for creating a textured press plate includes: applying a mask to a surface of a press plate; processing the surface of the press plate to obtain a surface structure in the surface of the press plate; polishing the surface of the press plate; cleaning the surface of the press plate; applying a metallic coating to the surface of the press plate to obtain a first degree of gloss on the surface of the press plate; applying a first protective layer over portions of the surface of the press plate; matting the surface of the press plate to obtain a second degree of gloss on the surface of the press plate; applying a second protective layer over portions of the surface of the press plate; and polishing the surface of the press plate to obtain a third degree of gloss on the surface of the press plate.

In another embodiment, a method for creating a textured press plate includes: applying a mask to a surface of a press plate; processing the surface of the press plate to obtain a surface structure in the surface of the press plate; polishing the surface of the press plate; cleaning the surface of the press plate; applying a first protective layer over portions of the surface of the press plate; polishing the surface of the press plate to obtain a first degree of gloss on the surface of the press plate; applying a second protective layer over portions of the surface of the press plate; matting the surface of the press plate to obtain a second degree of gloss on the surface of the press plate; and applying a metallic coating to the surface of the press plate.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
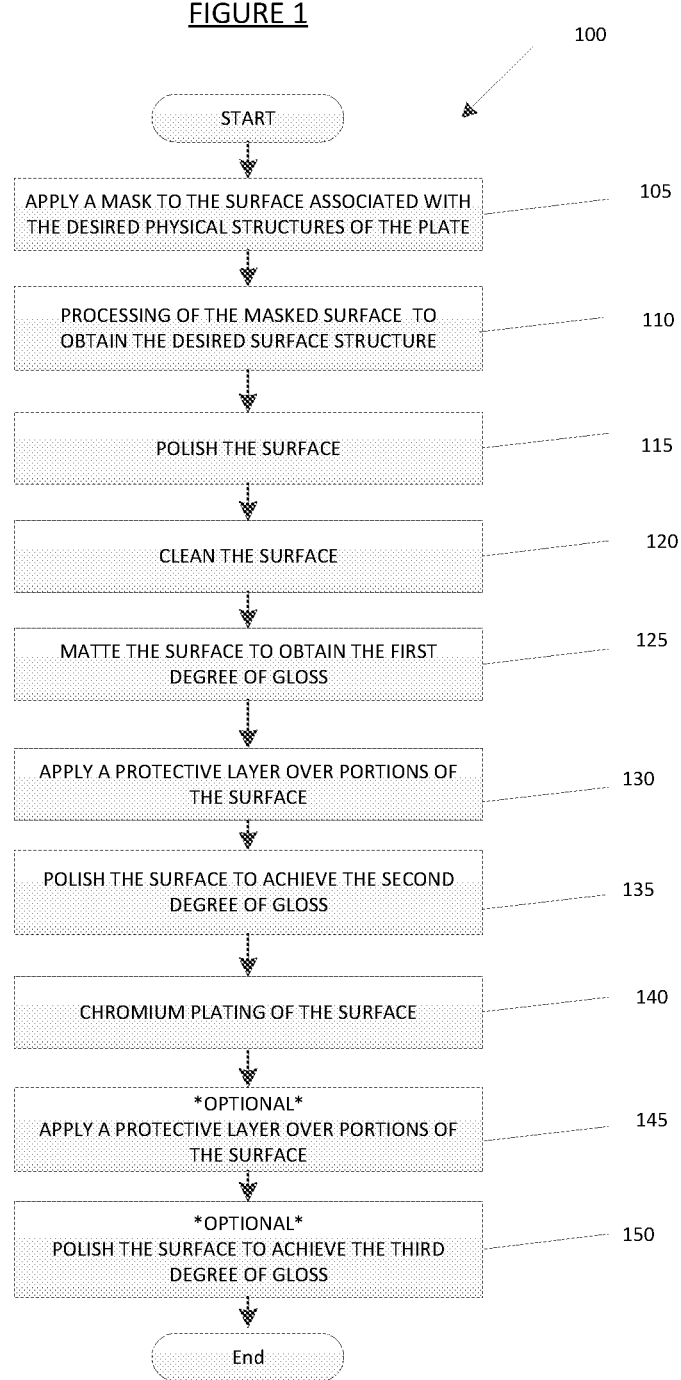

Having thus described embodiments of the invention in general terms, reference will now be made the accompanying drawings, wherein:

FIG. 1 depicts a general process flow 100 for creating a textured press plate in accordance with one embodiment of the present invention.

Figure 2:
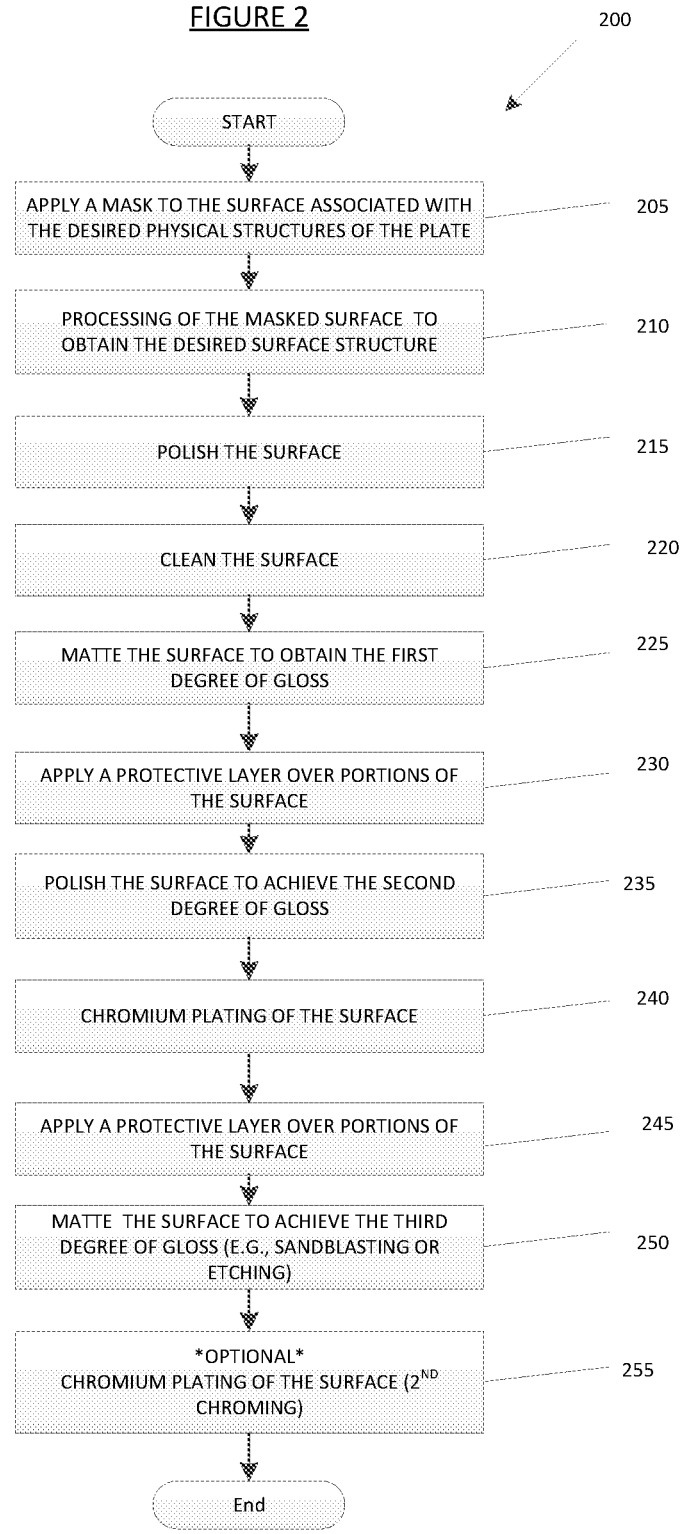

FIG. 2 depicts a general process flow 200 for creating a textured press plate in accordance with another embodiment of the present invention.

Figure 3:
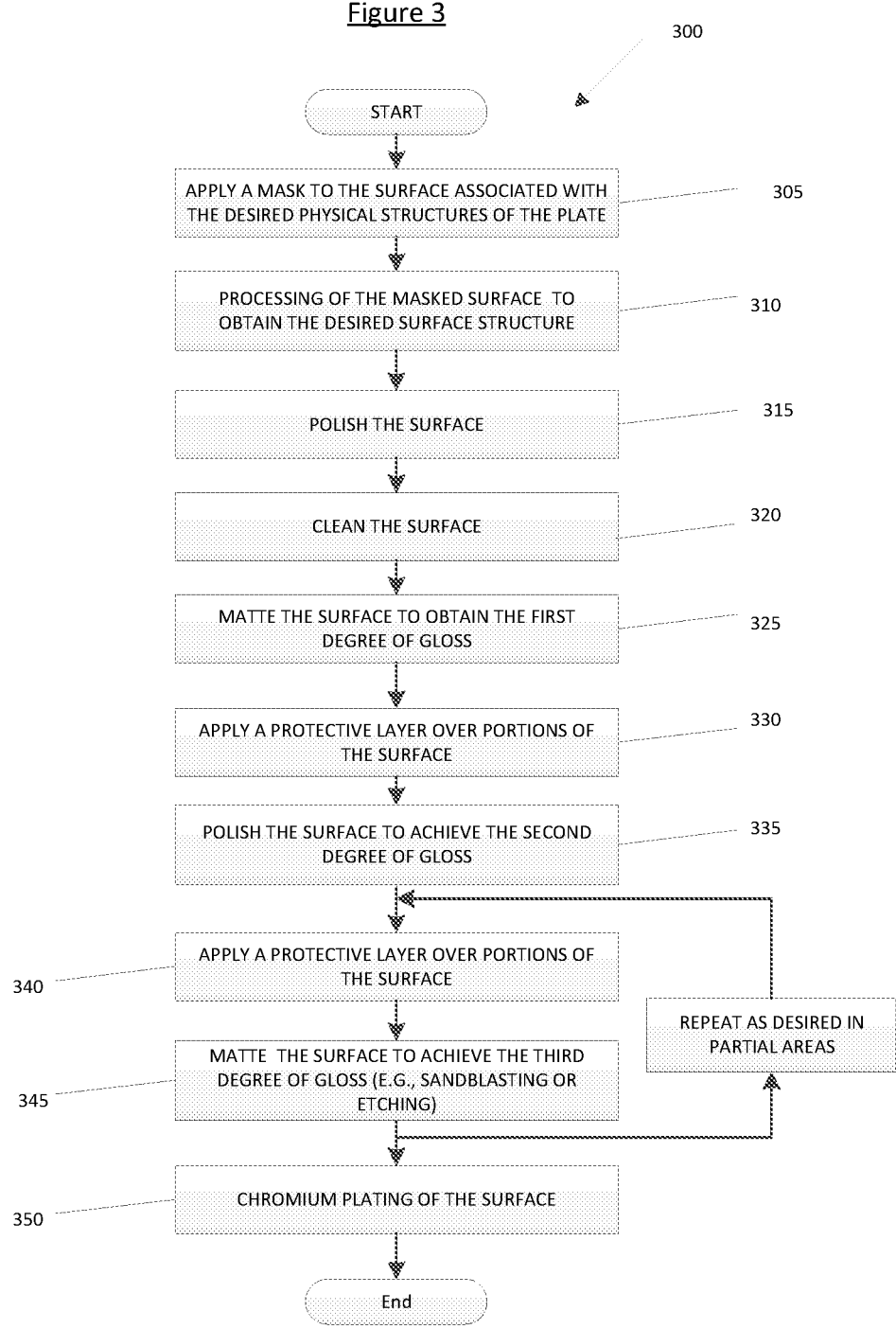

FIG. 3 depicts a general process flow 300 for creating a textured press plate in accordance with another embodiment of the present invention.

Figure 4:
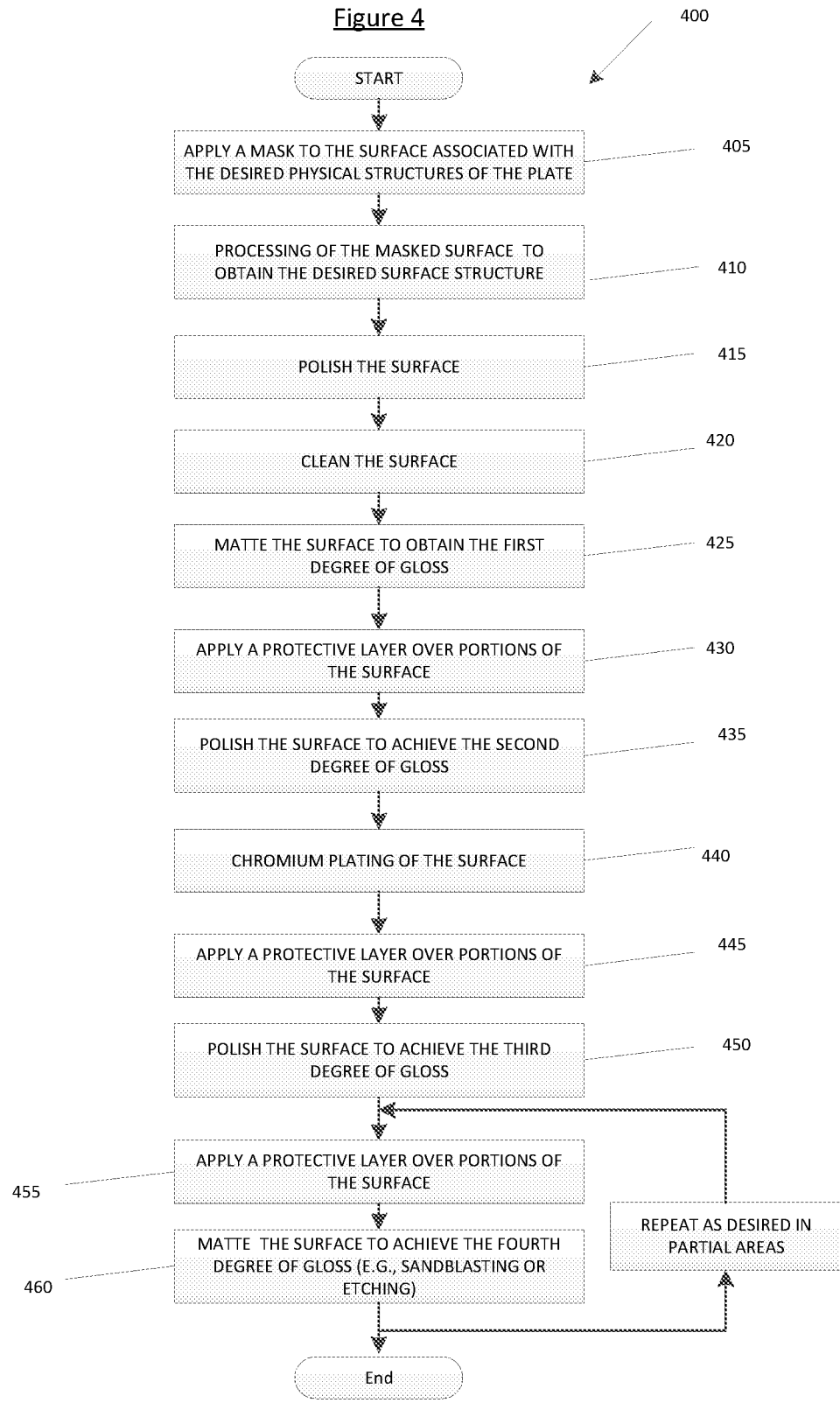

FIG. 4 depicts a general process flow 400 for creating a textured press plate in accordance with another embodiment of the present invention.

Figure 5:
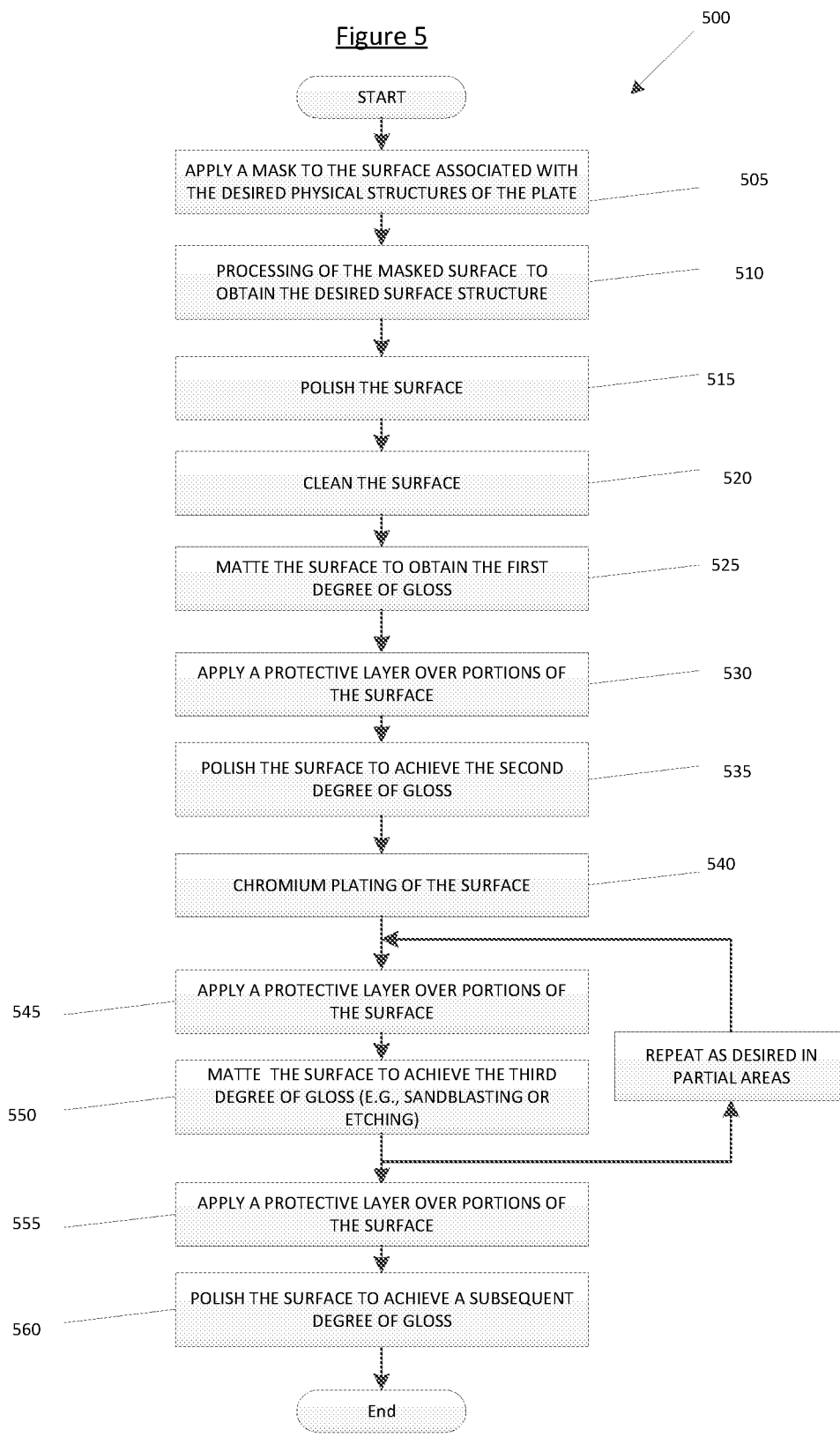

FIG. 5 depicts a general process flow 500 for creating a textured press plate in accordance with another embodiment of the present invention.

Figure 6:
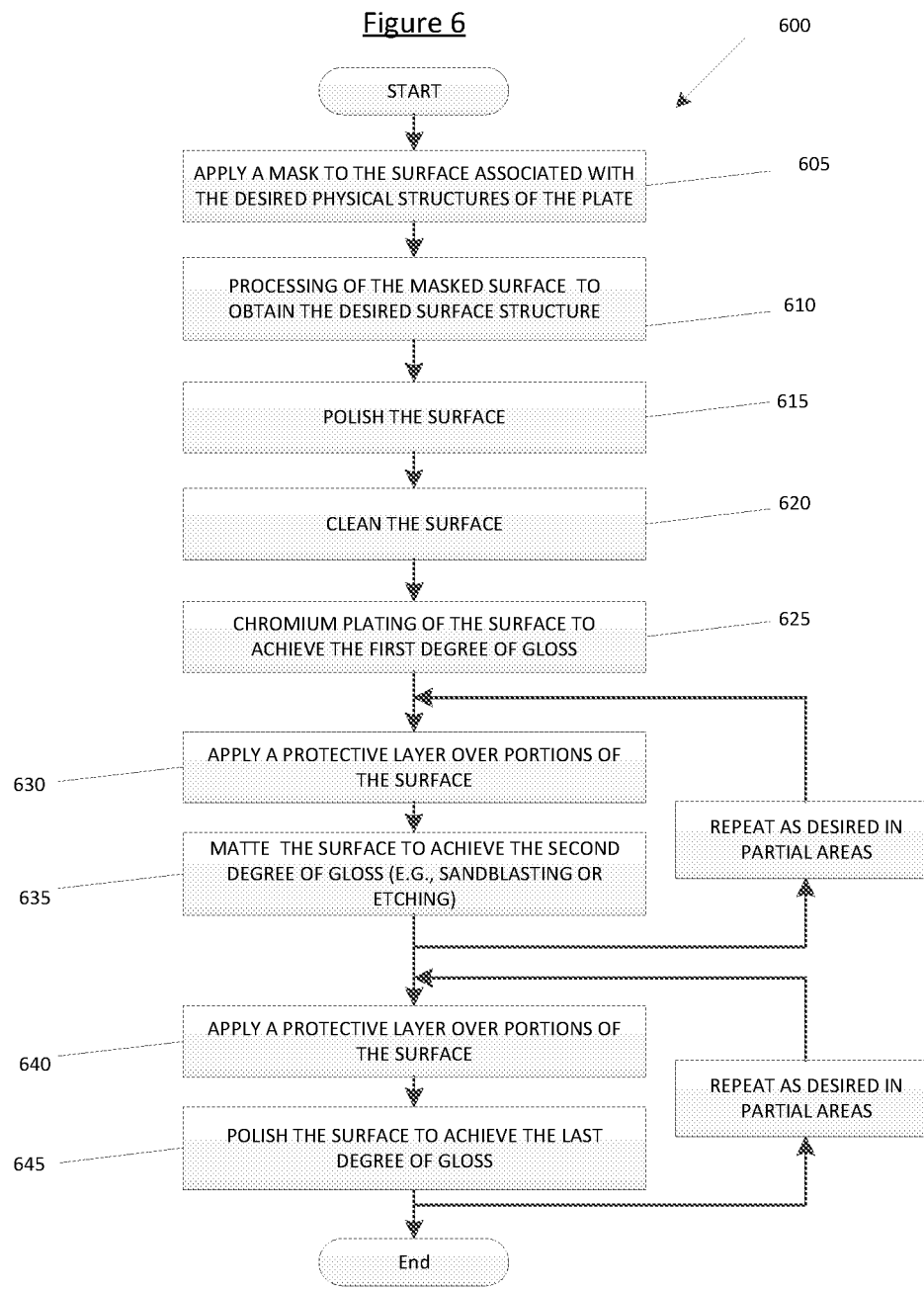

FIG. 6 depicts a general process flow 600 for creating a textured press plate in accordance with another embodiment of the present invention.

Figure 7:
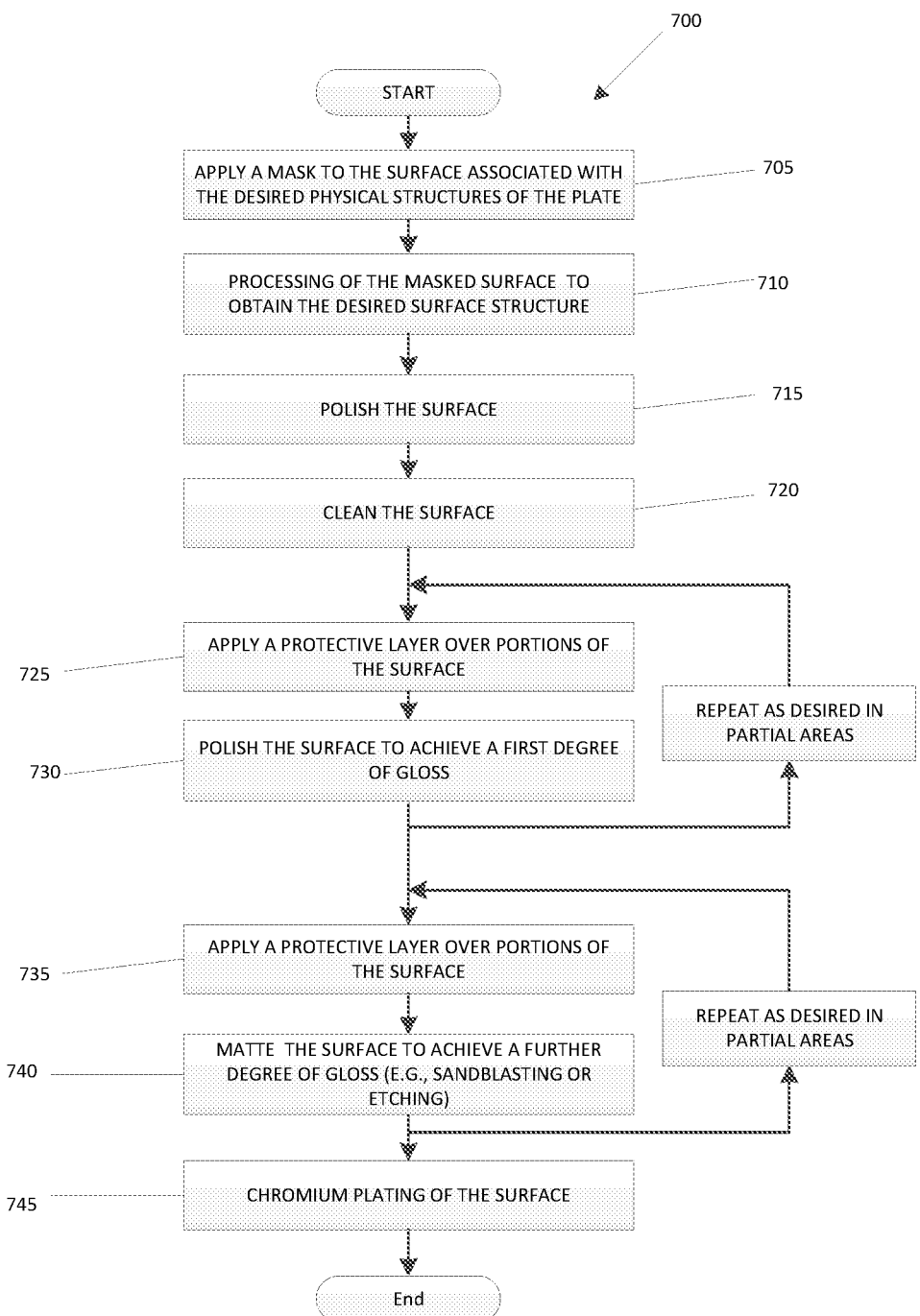

FIG. 7 depicts a general process flow 700 for creating a textured press plate in accordance with another embodiment of the present invention.

Figure 8:
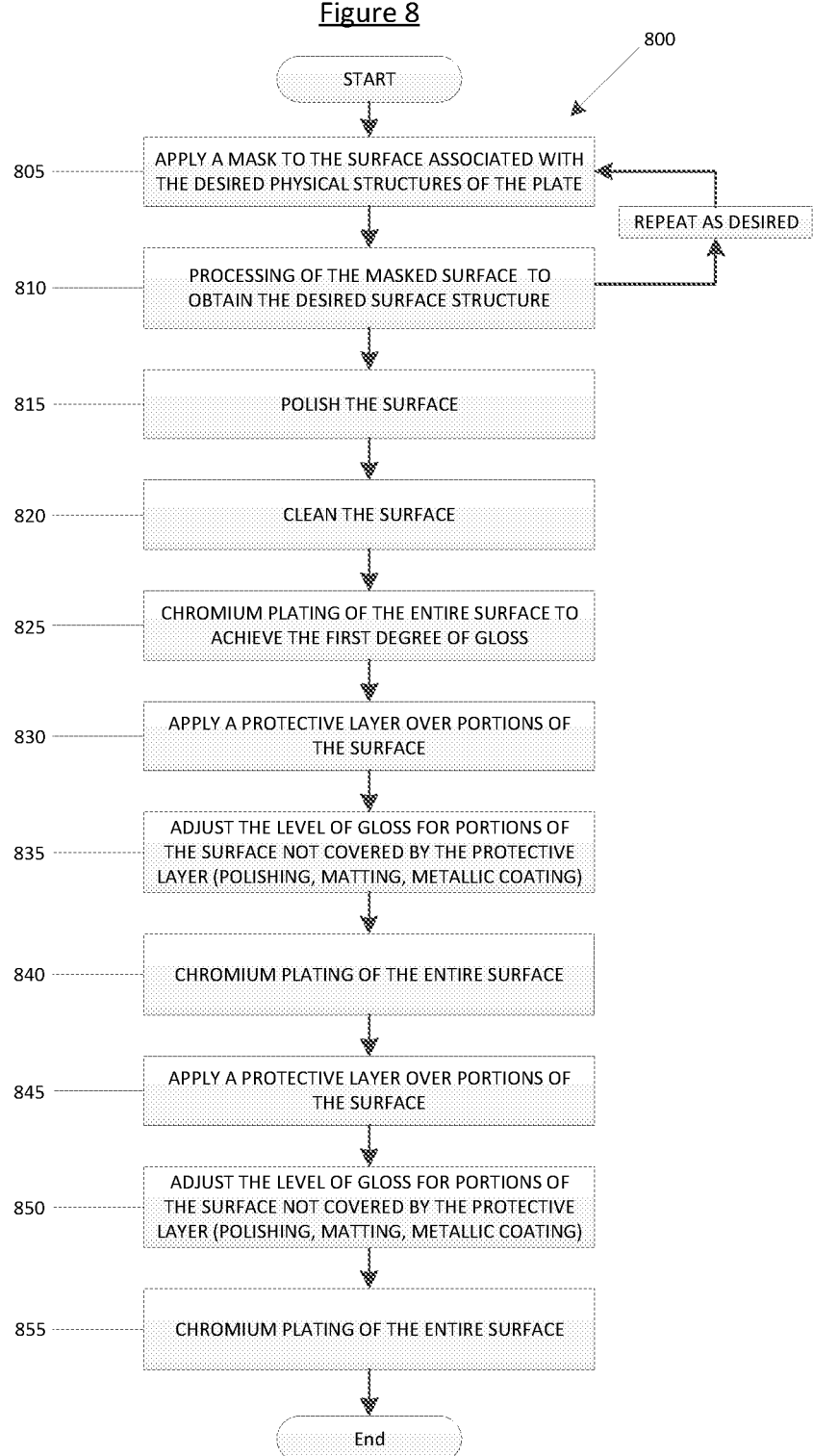

FIG. 8 depicts a general process flow 800 for creating a textured press plate in accordance with another embodiment of the present invention.

Figure 9:
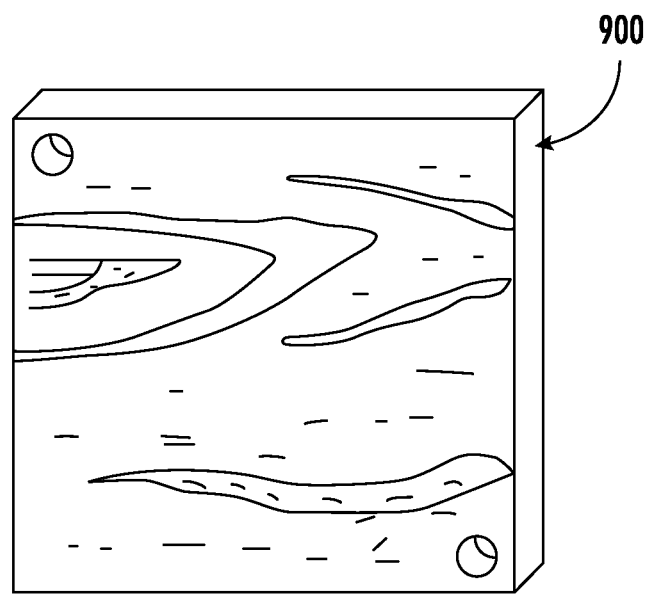

FIG. 9 depicts a textured press plate comprising varied levels of gloss, in accordance with another embodiment of the present invention.

FIG. 10 depicts a press plate as it undergoes a series of steps to achieve a textured surface with varied levels of gloss, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In one aspect, the present invention embraces a method for creating a textured press plate. Typically, the press plate is initially processed to create a desired structure in the surface of the press plate. Thereafter, various techniques may be used to create differing degrees of gloss in differing portions of the surface of the press plate. For example, matting may be used to decrease the degree of gloss of a portion of the surface, and polishing may be used to increase the degree of gloss of a portion of the surface. Additionally or alternatively, a metallic coating (e.g., chromium plating) may be applied to the surface of the press plate, where the metallic coating provides an increased or decreased level of gloss for the surface of the press plate. In some embodiments, the metallic coating is applied to the entire surface of the press plate, or at least in the entire surface of the press plate that will be used to stamp out panels, flooring, or the like. In other embodiments, a protective layer is applied to the surface of the press plate before the metallic coating is applied, thereby coating only portions of the press plate surface that are not covered by the protective layer. The application of a metallic coating, including chromium plating, to the surface of the press plate provides a change to the level(s) of gloss on the surface, added protection to the structured surface, added protection to any previous gloss-adjusting steps, and creates a stable point from which additional gloss-adjusting steps can be applied. The textured press plate may then be used to create a corresponding textured laminate having multiple degrees of gloss.

FIG. 1 depicts a general process flow 100 for creating a textured press plate in accordance with one embodiment of the present invention. Initially, at block 105, a mask is applied to a surface of a press plate. Typically, the press plate is rigid and metallic. For example, the press plate may be made from stainless steel (e.g., 410- or 630-grade hardened stainless steel). That said, it is within the scope of the present invention for the press plate to be formed of other materials.

Typically, the mask corresponds to a desired physical surface structure (e.g., a wood-like structure) for the surface of the press plate. In particular, the mask typically defines which areas of the press plate will be etched and which areas will not be etched in a subsequent processing step that creates the desired surface structure. As such, the material used to create the mask is typically resistant to one or more chemical solutions that may be used for etching. The mask may be printing on the surface of the press plate (e.g., via a digital printing technique). In this regard, U.S. Pat. No. 8,778,202, which is hereby incorporated by reference in its entirety, depicts a method of applying a chemically resistant ink to the surface of a press plate.

Next, at block 110, the masked surface of the press plate is processed to obtain the desired surface structure. Typically, the press plate is processed via chemical etching (e.g., using a ferric chloride solution). Typically, areas of the press plate surface covered by the mask are not etched, and areas of the press plate surface not covered by the mask are etched.

At blocks 115 and 120 the surface of the press plate is typically polished and cleaned. In this regard, the surface of the press plate may be polished via mechanical polishing or electropolishing. Cleaning and polishing of the surface of the press plate may include degreasing the surface and removing the mask. Cleaning and polishing of the surface of the press plate may also include activating the surface of the press plate. Activating the surface of the press plate may improve the adhesion of subsequent layers/coatings to the press plate.

At block 125, the surface of the press plate is matted to obtain a first degree of gloss on the surface of the press plate. Matting of the press plate may be performed via matte etching or sandblasting. In some embodiments, prior to matting the surface of the press plate, a protective layer is applied over portions of the surface so that only portions of the press plate not covered by such protective layer will have the first degree of gloss.

At blocks 130 and 135, a protective layer is applied over portions of the surface of the press plate, and the surface is polished (e.g., via mechanical polishing or electropolishing) to achieve a second degree of gloss. This protective layer is typically formed from a material that is resistant to polishing. Following the polishing at block 135, the areas of the surface covered by the protective layer will typically retain the first degree of gloss, and the areas of the surface not covered by the protective layer will typically have the second degree of gloss.

At block 140, a metallic coating is typically applied to the surface of the press plate. Typically, the metallic coating functions to protect the press plate and may be quite hard, which aids the use of the press plate in pressing operations. Chromium plating is typically used, but the use of other metallic coatings is within the scope of the present invention. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

Optionally, at blocks 145 and 150, a protective layer is applied over portions of the surface of the press plate, and the surface is polished (e.g., via mechanical polishing or electropolishing) to achieve a third degree of gloss. This protective layer is typically formed from a material that is resistant to polishing. Following the polishing at block 150, the areas of the surface covered by the protective layer will typically retain (as applicable) either the first degree of gloss or the second degree of gloss, and the areas of the surface not covered by the protective layer may have the third degree of gloss.

FIG. 2 depicts a general process flow 200 for creating a textured press plate in accordance with another embodiment of the present invention. Initially, at block 205, a mask is applied to a surface of a press plate. Next, at block 210, the masked surface of the press plate is processed (e.g., via chemical etching) to obtain a desired surface structure. At blocks 215 and 220 the surface of the press plate is typically polished and cleaned. In some embodiments, cleaning and polishing the surface of the press plate may include activating the surface of the press plate. At block 225, the surface of the press plate is matted (e.g., via matte etching or sandblasting) to obtain a first degree of gloss on the surface of the press plate. In some embodiments, prior to matting the surface of the press plate, a protective layer is applied over portions of the surface so that only portions of the press plate not covered by such protective layer will have the first degree of gloss.

At blocks 230 and 235, a protective layer is applied over portions of the surface of the press plate, and the surface is polished (e.g., via mechanical polishing or electropolishing) to achieve a second degree of gloss. Following the polishing at block 235, the areas of the surface covered by the protective layer will typically retain the first degree of gloss, and the areas of the surface not covered by the protective layer will typically have the second degree of gloss.

At block 240, a metallic coating (e.g., chromium plating) is typically applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

At blocks 245 and 250, a protective layer is applied over portions of the surface of the press plate, and the surface is matted (e.g., via matte etching or sandblasting) to achieve a third degree of gloss. This protective layer is typically formed from a material that is resistant to matting. Following the matting at block 250, the areas of the surface covered by the protective layer will typically retain (as applicable) either the first degree of gloss or the second degree of gloss, and the areas of the surface not covered by the protective layer may have the third degree of gloss.

Optionally, at block 255, a second metallic coating (e.g., chromium plating) may be applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

FIG. 3 depicts a general process flow 300 for creating a textured press plate in accordance with another embodiment of the present invention. Initially, at block 305, a mask is applied to a surface of a press plate. Next, at block 310, the masked surface of the press plate is processed (e.g., via chemical etching) to obtain a desired surface structure. At blocks 315 and 320 the surface of the press plate is typically polished and cleaned. In some embodiments, cleaning and polishing the surface of the press plate may include activating the surface of the press plate. At block 325, the surface of the press plate is matted (e.g., via matte etching or sandblasting) to obtain a first degree of gloss on the surface of the press plate. In some embodiments, prior to matting the surface of the press plate, a protective layer is applied over portions of the surface so that only portions of the press plate not covered by such protective layer will have the first degree of gloss.

At blocks 330 and 335, a protective layer is applied over portions of the surface of the press plate, and the surface is polished (e.g., via mechanical polishing or electropolishing) to achieve a second degree of gloss. Following the polishing at block 335, the areas of the surface covered by the protective layer will typically retain the first degree of gloss, and the areas of the surface not covered by the protective layer will typically have the second degree of gloss.

At blocks 340 and 345, a protective layer is applied over portions of the surface of the press plate, and the surface is matted (e.g., via matte etching or sandblasting) to achieve a third degree of gloss. This protective layer is typically formed from a material that is resistant to matting. Following the matting at block 345, the areas of the surface covered by the protective layer will typically retain (as applicable) either the first degree of gloss or the second degree of gloss, and the areas of the surface not covered by the protective layer may have the third degree of gloss. The steps described with respect to blocks 340 and 345 may be repeated for portions of the surface of the press plate to achieve additional degrees of gloss (e.g., a fourth or fifth degree of gloss).

Finally, at block 350, a metallic coating (e.g., chromium plating) is typically applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

FIG. 4 depicts a general process flow 400 for creating a textured press plate in accordance with another embodiment of the present invention. Initially, at block 405, a mask is applied to a surface of a press plate. Next, at block 410, the masked surface of the press plate is processed (e.g., via chemical etching) to obtain a desired surface structure. At blocks 415 and 420 the surface of the press plate is typically polished and cleaned. In some embodiments, cleaning and polishing the surface of the press plate may include activating the surface of the press plate. At block 425, the surface of the press plate is matted (e.g., via matte etching or sandblasting) to obtain a first degree of gloss on the surface of the press plate. In some embodiments, prior to matting the surface of the press plate, a protective layer is applied over portions of the surface so that only portions of the press plate not covered by such protective layer will have the first degree of gloss.

At blocks 430 and 435, a protective layer is applied over portions of the surface of the press plate, and the surface is polished (e.g., via mechanical polishing or electropolishing) to achieve a second degree of gloss. Following the polishing at block 435, the areas of the surface covered by the protective layer will typically retain the first degree of gloss, and the areas of the surface not covered by the protective layer will typically have the second degree of gloss.

At block 440, a metallic coating (e.g., chromium plating) is typically applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

At blocks 445 and 450, a protective layer is applied over portions of the surface of the press plate, and the surface is polished (e.g., via mechanical polishing or electropolishing) to achieve a third degree of gloss. Following the polishing at block 450, the areas of the surface covered by the protective layer will typically retain (as applicable) either the first degree of gloss or the second degree of gloss, and the areas of the surface not covered by the protective layer may have the third degree of gloss.

At blocks 455 and 460, a protective layer is applied over portions of the surface of the press plate, and the surface is matted (e.g., via matte etching or sandblasting) to achieve a fourth degree of gloss. This protective layer is typically formed from a material that is resistant to matting. Following the matting at block 460, the areas of the surface covered by the protective layer will typically retain (as applicable) either the first, second, or third degree of gloss, and the areas of the surface not covered by the protective layer may have the fourth degree of gloss. The steps described with respect to blocks 455 and 460 may be repeated for portions of the surface of the press plate to achieve additional degrees of gloss (e.g., a fifth or sixth degree of gloss).

FIG. 5 depicts a general process flow 500 for creating a textured press plate in accordance with another embodiment of the present invention. Initially, at block 505, a mask is applied to a surface of a press plate. Next, at block 510, the masked surface of the press plate is processed (e.g., via chemical etching) to obtain a desired surface structure. At blocks 515 and 520 the surface of the press plate is typically polished and cleaned. In some embodiments, cleaning and polishing the surface of the press plate may include activating the surface of the press plate. At block 525, the surface of the press plate is matted (e.g., via matte etching or sandblasting) to obtain a first degree of gloss on the surface of the press plate. In some embodiments, prior to matting the surface of the press plate, a protective layer is applied over portions of the surface so that only portions of the press plate not covered by such protective layer will have the first degree of gloss.

At blocks 530 and 535, a protective layer is applied over portions of the surface of the press plate, and the surface is polished (e.g., via mechanical polishing or electropolishing) to achieve a second degree of gloss. Following the polishing at block 535, the areas of the surface covered by the protective layer will typically retain the first degree of gloss, and the areas of the surface not covered by the protective layer will typically have the second degree of gloss.

At block 540, a metallic coating (e.g., chromium plating) is typically applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

At blocks 545 and 550, a protective layer is applied over portions of the surface of the press plate, and the surface is matted (e.g., via matte etching or sandblasting) to achieve a third degree of gloss. This protective layer is typically formed from a material that is resistant to matting. Following the matting at block 550, the areas of the surface covered by the protective layer will typically retain (as applicable) either the first degree of gloss or the second degree of gloss, and the areas of the surface not covered by the protective layer may have the third degree of gloss. The steps described with respect to blocks 545 and 550 may be repeated for portions of the surface of the press plate to achieve additional degrees of gloss (e.g., a fourth or fifth degree of gloss).

At blocks 555 and 560, a protective layer is applied over portions of the surface of the press plate, and the surface is polished (e.g., via mechanical polishing or electropolishing) to achieve a final degree of gloss (e.g., a fourth of fifth degree of gloss). Following the polishing at block 560, the areas of the surface covered by the protective layer will typically retain a prior degree of gloss, and the areas of the surface not covered by the protective layer may have the final degree of gloss.

FIG. 6 depicts a general process flow 600 for creating a textured press plate in accordance with another embodiment of the present invention. Initially, at block 605, a mask is applied to a surface of a press plate. Next, at block 610, the masked surface of the press plate is processed (e.g., via chemical etching) to obtain a desired surface structure. At blocks 615 and 620 the surface of the press plate is typically polished and cleaned. In some embodiments, cleaning and polishing the surface of the press plate may include activating the surface of the press plate.

At block 625, a metallic coating (e.g., chromium plating) is typically applied to the surface of the press plate to achieve a first degree of gloss. In some instances, a protective layer is applied over portions of the surface of the press plate prior to applying the metallic coating so that the metallic coating is only applied to areas not covered by such protective layer.

At blocks 630 and 635, a protective layer is applied over portions of the surface of the press plate, and the surface is matted (e.g., via matte etching or sandblasting) to achieve a second degree of gloss. This protective layer is typically formed from a material that is resistant to matting. Following the matting at block 635, the areas of the surface covered by the protective layer will typically retain the first degree of gloss, and the areas of the surface not covered by the protective layer will typically have the second degree of gloss. The steps described with respect to blocks 630 and 635 may be repeated for portions of the surface of the press plate to achieve additional degrees of gloss (e.g., a third or fourth degree of gloss).

At blocks 640 and 645, a protective layer is applied over portions of the surface of the press plate, and the surface is polished (e.g., via mechanical polishing or electropolishing) to achieve a subsequent degree of gloss (e.g., a third or fourth degree of gloss). Following the polishing at block 645, the areas of the surface covered by the protective layer will typically retain a prior degree of gloss, and the areas of the surface not covered by the protective layer may have the subsequent degree of gloss. Finally, the steps described with respect to blocks 640 and 645 may be repeated for portions of the surface of the press plate to achieve additional degrees of gloss (e.g., a fourth or fifth degree of gloss).

In some embodiments, the steps described with respect to blocks 640 and 645 may be performed prior to the steps described with respect to blocks 630 and 635 (i.e., so that one or more degrees of gloss are created via polishing before one or more degrees of gloss are created via matting).

FIG. 7 depicts a general process flow 700 for creating a textured press plate in accordance with another embodiment of the present invention. Initially, at block 705, a mask is applied to a surface of a press plate. Next, at block 710, the masked surface of the press plate is processed (e.g., via chemical etching) to obtain a desired surface structure. At blocks 715 and 720 the surface of the press plate is typically polished and cleaned. In some embodiments, cleaning and polishing the surface of the press plate may include activating the surface of the press plate.

At blocks 725 and 730, a protective layer is typically applied over portions of the surface of the press plate, and the surface is polished (e.g., via mechanical polishing or electropolishing) to achieve a first degree of gloss. Following the polishing at block 730, the areas of the surface not covered by the protective layer will typically have the first degree of gloss. That said, in some embodiments, a protective layer might not be applied over portions of the surface of the press plate prior to polishing the surface. The steps described with respect to blocks 725 and 730 may be repeated for portions of the surface of the press plate to achieve additional degrees of gloss (e.g., a second or third degree of gloss).

At blocks 735 and 740, a protective layer is applied over portions of the surface of the press plate, and the surface is matted (e.g., via matte etching or sandblasting) to achieve a further degree of gloss (e.g., a second or third degree of gloss). This protective layer is typically formed from a material that is resistant to matting. Following the matting at block 740, the areas of the surface covered by the protective layer will typically retain a previous degree of gloss (e.g., the first degree of gloss), and the areas of the surface not covered by the protective layer may have the further degree of gloss. The steps described with respect to blocks 735 and 740 may be repeated for portions of the surface of the press plate to achieve additional degrees of gloss (e.g., a third or fourth degree of gloss).

Finally, at block 745, a metallic coating (e.g., chromium plating) is typically applied to the surface of the press plate. In some embodiments, the metallic coating functions to provide a further degree of gloss to the press plate. In some instances, a protective layer is applied over portions of the surface of the press plate prior to applying the metallic coating so that the metallic coating is only applied to areas not covered by such protective layer.

In some embodiments, the steps described with respect to blocks 725 and 730 might not be performed. Rather, multiple degrees of gloss may be achieved by repeating the steps described with respect to blocks 735 and 740 one or more times.

FIG. 8 depicts a general process flow 800 for creating a textured press plate in accordance with one or more embodiments of the invention. Initially, at block 805, a mask (or any protective layer) is applied to portions of the surface of the press plate. Next, at block 810, the masked surface of the press plate is processed (e.g., via chemical etching) to obtain a desired surface structure. As indicated in the process flow

800, the steps represented in blocks 805 and 810 may be repeated any number of times to achieve a structured surface of the press plate that meets a desired design. For example, the desired design may be that of a wood panel with detailed fine grain structures, a stone panel, a composite panel, and the like.

Once the desired structure of the press plate has been achieved, the process 800 may continue to block 815 and 820, where the surface of the press plate is polished and cleaned. In some embodiments, polishing and/or cleaning the surface of the press plate may include activating the surface of the press plate for better adhesion of a protective layer and/or a metallic coating layer.

In some embodiments, additional processing steps may occur before, between, after, and/or in the place of blocks 815. These additional processing steps include, but are not limited to, additional polishing of the surface, additional cleaning of the surface, matting of the surface, partial chromium plating of the surface, full chromium plating of the surface, activation of the surface, and the like.

At block 825, a layer of chromium plating is applied to the entire surface of the press plate, where the chromium plating layer gives the surface a first degree of gloss. This first full layer of chromium plating can serve to protect the processed structure of the press plate surface, provide the first layer of gloss, provide a base for additional gloss-adjusting layers, and the like. In some embodiments, this first full chromium plating layer comprises a relatively high level of gloss, while in other embodiments, this first full chromium plating layer is added in such a manner that the chromium plating is matted as it is applied to the surface to provide a relatively low level of gloss.

Once the chromium plating layer of block 825 has been applied, the process 800 may continue to blocks 830 and 835, where a protective layer is applied over portions of the surface of the press plate, and the portions of the press plate not covered by the protective layer are adjusted to achieve a different level of gloss. This adjustment step of block 835 can be completed using any technique described or otherwise embodied herein. For example, the surface may be polished (e.g., mechanical polishing or electropolishing), the surface may be matted (e.g., via matte etching, sandblasting, chemical etching, etc.), or a metallic coating (e.g., a partial chromium plating) can be applied to the surface. The protective layer of block 830 can then be removed, leaving the first level of gloss on the surfaces that had been covered by the protective layer.

In some embodiments, multiple or additional gloss-adjusting steps may be performed on the surface of the press plate. Again, these gloss-adjusting steps may include, but are not limited to, polishing, matting, and metallic coating of the surface. Furthermore, each of these gloss-adjusting steps may or may not be preceded by the application of a protective layer (e.g., the same protective layer as in block 830, a different protective layer, or a different protective layer covering the same area as the protective layer in block 830). For example, the process 800 may include polishing the surface at block 835, which is followed by a set of protective layer and matting steps that covers an overlapping area of the polishing from block 835.

While these additional gloss-adjusting steps are contemplated, typically the process 800 moves from the first gloss-adjusting step in block 835 directly to block 840, where a second layer of chromium plating can be applied to across the entire surface of the press plate. This second layer of chromium plating is applied on top of the first chromium plating (i.e., from block 825), and the gloss adjusting steps (i.e., from blocks 830 and 835) that were performed on the first layer of chromium plating. As such, this second layer of chromium plating protects the entire surface of the press plate (or at least the entire portion of the surface that will be used to stamp out panels) from inadvertent tampering with the press plate structure or gloss levels, and from the introduction of impurities to the press plate surface system that could affect the sensitive qualities of the surface after certain gloss adjustment steps have been performed. Additionally, this second layer of chromium plating adjusts the level of gloss across the entire surface of the press plate. Note, however that any previous gloss adjustments to portions of the surface would continue to provide a different level of gloss, as compared to the portions of the surface that did not receive a previous gloss adjustment. In any event, the inclusion of this second chromium plating step provides additional and important improvements to the visual and functional properties of the press plate that would not otherwise be obtained by a process that omits this step. Indeed, the visual effect from implementing this second full chromium plating step is different from a visual effect of polishing or matting the surface of the press plate.

After the second full chromium plating step has been conducted, the process 800 may continue to blocks 845 and 850, where a protective layer is applied over portions of the surface of the press plate, and the portions of the press plate not covered by the protective layer are adjusted to achieve a different level of gloss. This adjustment step of block 850 can be completed using any technique described or otherwise embodied herein. For example, the surface may be polished (e.g., mechanical polishing or electropolishing), the surface may be matted (e.g., via matte etching, sandblasting, chemical etching, etc.), or a metallic coating (e.g., a partial chromium plating) can be applied to the surface. The protective layer of block 845 can then be removed, leaving the previous level of gloss at the surfaces that had been covered by the protective layer. Additionally, and as described above with respect to block 835, additional gloss-adjusting steps (e.g., matting, polishing, partial metallic plating) can be performed after block 850.

That said, while these additional gloss-adjusting steps are contemplated, typically the process 800 moves from the second partial gloss-adjusting step in block 850 directly to a final step of block 855, without any additional partial gloss-adjusting steps.

In block 855, a final chromium plating layer is applied to the entire surface of the press plate. This final chromium plating layer provides a final protective layer for all structural and gloss-adjustment steps previously conducted. The final chromium plating of the entire surface creates a strong interface that retains its structured shape when stamping the press plate into panels. The final chromium plating layer also preserves the gloss levels of each portion of the press plate. In some embodiments, the final chromium plating does adjust the gloss level of the entire surface. This adjustment may be uniform, such that each area of varied gloss levels may increase or decrease in the same amount, or in a proportional amount relative to the normal gloss level of the applied final chromium plating layer.

FIG. 9 illustrates a sample press plate 900 and its structured and/or gloss-adjusted design. As described above, the press plate 900 can be structured to resemble a known substance (e.g., wood, rock, composite, etc.), or can be structured to resemble an image, or the like. As shown in FIG. 9, the surface can closely resemble the structure of wood, including pores, grain, streaks, knots, and the like. While the structuring of the press plate can be completed to achieve a very detailed design, the levels of gloss for each structural component of the press plate 900 provides a specific amount of shine that can be tailored to resemble the precise gloss levels of minute features of wood. Therefore, the gloss-adjusting techniques described herein are important in providing a press plate 900 capable of stamping out a panel that compellingly resembles a wood surface.

FIG. 10 depicts a series of cross-sections of a press plate 1000 as it undergoes a process 1100 for structuring the press plate 1000 and for obtaining varied degrees of gloss at certain portions of the press plate 1000. This process 1100 illustrates the physical changes to a press plate 1000 as it undergoes one or more embodiments of the process 800 described in FIG. 8.

The process 1100 begins at step 1105, where a base press plate 1005 is created, forged, obtained, or otherwise generated. Next, at step 1110, a mask 1010 or other protective layer is applied to portions of the surface of the base press plate 1005. Once the mask 1010 is applied, the masked surface of the based press plate 1005 is processed (e.g., via chemical etching) to obtain a desired surface structure. Step 1115 illustrates how the portions of the surface of the base press plate 1005 are processed (e.g., eroded, cut out, dissolved, etched, etc.) to form recessions 1015 in the base press plate 1005. The processing steps can be repeated with varied masking positions to obtain a specific desired surface structure of the base press plate 1005. While FIG. 10 illustrates straight, block-like recessions 1015, it is contemplated that the structure can form and configuration, such that the surface of the base press plate 1005 may include recessions 1015 that are angled, curved, jagged, and the like. As such, the surface of the base press plate 1005 can be configured to be either exactly conforming to a desired structure for the press plate, or to a structure that is close to the desired structure, where additional partial metallic plating may provide additional structural details later.

Once the base press plate 1005 has achieved its desired structure, the surface of the base press plate 1005 may be cleaned, polished, and/or activated. Next, as shown at step 1120, the entire surface of the structured base press plate 1005 may be coated with a first layer of chromium plating 1020. While this chromium plating 1020 layer and subsequent chromium plating layers 1035 and 1050 are referred to only as chromium plating, it is known that any other metallic coating could be applied and this example is not intended to be limiting to only chromium plating. This layer of chromium plating 1020 provides a first degree of gloss across (e.g., formed over) the entire surface of the press plate 1000. The chromium plating 1020 also serves to protect the processed structure of the press plate 1000, provide a solid base for additional gloss-adjusting layers or processes, and the like.

Once the chromium plating 1020 has been applied, the process 1100 may continue to step 1125, where a protective layer 1025 is applied to portions of the surface of the press plate 1000. As used herein, the term "press plate 1000" refers to the base press plate 1005 and any other layers, gloss-adjusted surfaces, masks, and the like that make up the product of the press plate 1000, through any stage of the process 1100. The term "surface of the press plate 1000" refers to the top surface of the press plate 1000, including any protective layers, metallic plating, polished surfaces, matted surfaces, and the like. The term "base press plate 1005" refers to the original base press plate 1005 and the structured base press plate 1005, on which chromium layers and other gloss adjusting steps are applied.

The protective layer 1025 is configured to protect the surface of the press plate 1000 that is covered by the protective layer 1025 from any gloss adjusting processing steps that may be performed while the protective layer 1025 is in place. As such, the protective layer 1025 may be positioned in orientations that will allow the surface of the press plate 1000 to be polished in accordance with desired gloss-levels, based on the desired design.

Step 1130 illustrates an embodiment of the press plate 1000 where the gloss level of the surface of the press plate 1000 has been adjusted by some gloss adjusting technique while the protective layer 1025 was in place. Of course, the protective layer 1025 is removed in the embodiment illustrated at step 1130. Portions of the surface of the press plate 1000 that were not covered by the protective layer 1025 now include an adjusted gloss level 1030. The gloss adjusting technique may be any gloss adjusting technique described herein. For example, polishing (e.g., mechanical polishing or electropolishing), matting (e.g., via matte etching, sandblasting, chemical etching, etc.), or metallic coating (e.g., a partial chromium plating). In some embodiments, additional gloss-adjusting techniques can be applied to the surface of the press plate 1000, possibly at different portions of the surface of the press plate 1000, to achieve a specific desired gloss level at this stage in the process 1100.

Next, as illustrated at step 1135, a second layer of chromium plating 1035 is applied across (e.g., formed over) the entire surface of the press plate 1000. As step 1130 shows, this chromium plating 1035 is applied on top of the first chromium plating 1020, including the gloss adjusted surfaces 1030. As such, this second layer of chromium plating 1035 protects the entire surface of the press plate 1000 (or at least the entire portion of the surface of the press plate 1000 that will be used to stamp out panels) from inadvertent tampering with the press plate 1000 structure or gloss levels, and from the introduction of impurities to the press plate 1000 product that could affect the sensitive qualities of the glossy surface.

Additionally, this second layer of chromium plating 1035 adjusts the level of gloss across (e.g., formed over) the entire surface of the press plate 1000. Note, however, that any previous gloss adjustments to portions of the surface (e.g., the gloss adjusted surface 1030) would continue to provide a different level of gloss to portions of the surface that did not receive the previous gloss adjustments.

After the second full chromium plating step has been conducted, the process 1100 may continue to step 1140, where a new protective layer 1040 is applied over portions of the surface of the press plate 1000. This protective layer 1040 may be the same as, be different from, or overlap portions of the first protective layer 1025, based on the desired positions of gloss adjusted surfaces.

Next, the surface of the press plate 1000 is subjected to a gloss adjusting step, such that the portions of the press plate 1000 surface that are not covered by the protective layer 1040 are subjected to the gloss adjusting step. Step 1145 illustrates an embodiment of the press plate 1000 after the surface of the press plate 1000 has undergone the gloss adjusting step and the protective layer 1040 has been removed. As shown in step 1145, a new gloss adjusted portion 1045 of the surface of the press plate 1000 is defined by the surface area that was not covered by the protective layer 1040.

The gloss adjusting technique may be any gloss adjusting technique described herein. For example, polishing (e.g., mechanical polishing or electropolishing), matting (e.g., via matte etching, sandblasting, chemical etching, etc.), or metallic coating (e.g., a partial chromium plating). In some embodiments, additional gloss-adjusting techniques can be applied to the surface of the press plate 1000, possibly at different portions of the surface of the press plate 1000, to achieve a specific desired gloss level at this stage in the process 1100.

Finally, the process 1100 moves to step 1150, where a final chromium plating 1050 layer is applied to the entire surface of the press plate 1000. This final chromium plating 1050 layer provides a final protective layer for all structural and gloss-adjustment steps previously conducted. The final chromium plating 1050 of the entire surface creates a strong interface for the press plate 1000 that retains its structured shape when stamping the press plate 1000 into panels. The final chromium plating 1050 layer also preserves the gloss levels of each portion of the press plate. In some embodiments, the final chromium plating 1050 does adjust the gloss level of the entire surface of the press plate 1000. This adjustment may be uniform, such that each area of varied gloss levels may increase or decrease in the same amount, or in a proportional amount relative to the normal gloss level of the applied final chromium plating 1050 layer.

As used herein, the term "entire surface," for example, when referring to applying a chromium plating layer to an entire surface of a press plate, refers at least to the portions of the surface of the press plate that will be interacting with (i.e., pressing or stamping into) panels. However, in some embodiments, the entire surface may refer to the entire surface of the press plate, including portions of the press plate that are beyond the surface that will be interacting with panels (e.g., handles, flanges, extra material, etc.). As such, the term "working surface" shall refer to those portions of the surface that are intended to be used in the pressing or stamping process. Therefore, in some embodiments, the chromium plating steps may comprise applying a chromium plating layer to the entire working surface of the press plate. In embodiments described herein, the term "entire surface" may be replaced with "entire working surface."

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for creating a textured press plate, comprising:

applying a mask to a working surface of a press plate;

processing the working surface of the press plate to obtain a structure in the working surface of the press plate;

polishing the working surface of the press plate;

cleaning the working surface of the press plate;

applying a first metallic coating to the entire working surface of the press plate;

after applying the first metallic coating, applying a first protective layer over portions of the working surface of the press plate;

adjusting a level of gloss for a portion of the working surface of the press plate not covered by the first protective layer;

removing the first protective layer;

after removing the first protective layer, applying a second metallic coating to the entire working surface of the press plate;

after applying the second metallic coating, applying a second protective layer over portions of the working surface of the press plate;

adjusting a level of gloss for a portion of the working surface of the press plate not covered by the second protective layer;

removing the second protective layer; and after removing the second protective layer, applying a third metallic coating to the entire working surface of the press plate.

2. The method according to claim 1, wherein the first metallic coating, the second metallic coating, or the third metallic coating comprises a chromium plating.

3. The method according to claim 1, wherein adjusting the level of gloss for the portion of the working surface of the press plate not covered by the first protective layer further comprises:

polishing the working surface of the press plate not covered by the first protective layer;

matting the working surface of the press plate not covered by the first protective layer; or applying a new metallic coating to the working surface of the press plate not covered by the first protective layer.

4. The method according to claim 1, wherein adjusting the level of gloss for the portion of the working surface of the press plate not covered by the second protective layer further comprises:

polishing the working surface of the press plate not covered by the second protective layer;

matting the working surface of the press plate not covered by the second protective layer; or applying a new metallic coating to the working surface of the press plate not covered by the second protective layer.

5. The method of claim 1, wherein the method further comprises:

in response to adjusting the level of gloss for the portion of the working surface of the press plate not covered by the first protective layer, applying a new protective layer over portions of the working surface of the press plate; and adjusting the level of gloss for the portion of the working surface of the press plate not covered by the new protective layer.

6. The method of claim 1, wherein the method further comprises:

after processing the working surface of the press plate to obtain the structure in the working surface of the press plate, applying a new mask to the working surface of a press plate; and processing the working surface of the press plate to obtain an additional structure in the working surface of the press plate at portions of the working surface of the press plate that are not covered by the new mask.

* * * * *